United States Patent
Zhou (10) Patent No.: US 10,626,615 B2
(45) Date of Patent: Apr. 21, 2020

(54) ASPHALTIC MEMBRANE WITH MULLITE-CONTAINING GRANULES

(71) Applicant: FIRESTONE BUILDING PRODUCTS CO., LLC, Nashville, TN (US)

(72) Inventor: Wensheng Zhou, Carmel, IN (US)

(73) Assignee: Firestone Building Products Co., LLC, Nashville, TN (US)

( * ) Notice: Subject to any disclaimer, the term of this patent is extended or adjusted under 35 U.S.C. 154(b) by 0 days.

(21) Appl. No.: 16/252,032

(22) Filed: Jan. 18, 2019

(65) Prior Publication Data

US 2019/0169848 A1   Jun. 6, 2019

Related U.S. Application Data (63) Continuation of application No. 15/385,102, filed on Dec. 20, 2016, now Pat. No. 10,227,780, which is a
(Continued)

(51) Int. Cl.
| | |
|---|---|
| *E04D 1/20* | (2006.01) |
| *E04D 5/12* | (2006.01) |
| *E04B 1/74* | (2006.01) |
| *E04D 1/22* | (2006.01) |
| *E04D 5/08* | (2006.01) |
| *E04D 1/00* | (2006.01) |
| *E04B 1/76* | (2006.01) |

(52) U.S. Cl.
CPC ............... *E04D 1/20* (2013.01); *E04B 1/74* (2013.01); *E04D 1/22* (2013.01); *E04D 5/08* (2013.01); *E04D 5/12* (2013.01); *E04B 2001/7691* (2013.01); *E04D 2001/005* (2013.01); *Y10T 428/24413* (2015.01)

(58) Field of Classification Search
CPC .... E04D 1/20; E04D 1/22; E04D 5/08; E04D 5/12; E04D 2001/005; E04B 1/74; E04B 2001/7691; Y10T 428/24413
See application file for complete search history.

(56) References Cited

U.S. PATENT DOCUMENTS

| | | |
|---|---|---|
| 2,981,636 A | 4/1961 | Lodge et al. |
| 3,013,893 A | 12/1961 | Olson et al. |
| | (Continued) | |

FOREIGN PATENT DOCUMENTS

| | | |
|---|---|---|
| EP | 1006165 A2 | 6/2000 |
| EP | 1935861 A1 | 6/2008 |
| | (Continued) | |

OTHER PUBLICATIONS

U.S. Appl. No. 13/022,395, filed Feb. 7, 2011.
(Continued)

*Primary Examiner* — Nathan L Van Sell
(74) *Attorney, Agent, or Firm* — Brian D. McAlhaney; Arthur M. Reginelli (57) ABSTRACT

A roofing article comprising (i) an asphaltic substrate; and (ii) a plurality of mullite-containing granules disposed on a surface of the substrate, where said mullite-containing granules include a mullite concentration of at least 35 wt % and at most 63 wt % as determined by quantitative x-ray diffraction.

8 Claims, 2 Drawing Sheets

Related U.S. Application Data continuation of application No. 13/538,244, filed on Jun. 29, 2012, now abandoned, which is a continuation of application No. PCT/US2010/062630, filed on Dec. 31, 2010.

(60) Provisional application No. 61/291,546, filed on Dec. 31, 2009.

(56) References Cited

U.S. PATENT DOCUMENTS

| | | | |
|---|---|---|---|
| 3,083,224 | A | 3/1963 | Brace et al. |
| 3,094,547 | A | 6/1963 | Heine |
| 3,208,871 | A | 9/1965 | Lodge et al. |
| 3,266,925 | A | 8/1966 | Lovness et al. |
| 4,034,022 | A | 7/1977 | Demarcq et al. |
| 4,359,505 | A | 11/1982 | Joedicke |
| 4,452,961 | A | 6/1984 | Koerner et al. |
| 4,478,869 | A | 10/1984 | Brady et al. |
| 4,486,476 | A | 12/1984 | Fritsch et al. |
| 4,537,595 | A | 8/1985 | Gruning et al. |
| 4,628,042 | A * | 12/1986 | Speronello ............ B01J 21/16 423/327.1 |
| 4,631,207 | A | 12/1986 | Price |
| 4,781,950 | A | 11/1988 | Giesing et al. |
| 4,810,748 | A | 3/1989 | Spells |
| 4,859,723 | A | 8/1989 | Kyminas et al. |
| 4,870,130 | A | 9/1989 | Achtenberg et al. |
| 4,876,152 | A | 10/1989 | Kang |
| 4,978,706 | A | 12/1990 | Dietlein et al. |
| 5,080,824 | A | 1/1992 | Bindl et al. |
| 5,183,839 | A | 2/1993 | Aharoni |
| 5,240,760 | A | 8/1993 | George et al. |
| 5,286,544 | A | 2/1994 | Graham |
| 5,300,239 | A | 4/1994 | Ozaki et al. |
| 5,362,566 | A | 11/1994 | George et al. |
| 5,380,687 | A * | 1/1995 | Mangold ............ B82Y 30/00 501/128 |
| 5,382,291 | A | 1/1995 | Olioso |
| 5,405,647 | A | 4/1995 | Grubka et al. |
| 5,424,258 | A * | 6/1995 | Mangold ............ B82Y 30/00 423/327.1 |
| 5,434,198 | A | 7/1995 | Meurer et al. |
| 5,484,477 | A | 1/1996 | George et al. |
| 5,573,810 | A | 11/1996 | Grubka |
| 5,695,373 | A * | 12/1997 | Blackmore ............ B32B 11/02 442/57 |
| 5,718,787 | A * | 2/1998 | Gallagher ............ B29C 70/50 156/62.4 |
| 6,054,221 | A | 4/2000 | Weigel et al. |
| 6,238,794 | B1 | 5/2001 | Beesley et al. |
| 6,271,289 | B1 | 8/2001 | Longoria et al. |
| 6,294,608 | B1 | 9/2001 | Hager et al. |
| 6,303,190 | B1 | 10/2001 | Linert et al. |
| 6,313,335 | B1 | 11/2001 | Roberts et al. |
| 6,391,948 | B1 | 5/2002 | Clark et al. |
| 6,541,563 | B2 | 4/2003 | Kron et al. |
| 6,545,104 | B1 | 4/2003 | Mueller et al. |
| 6,582,760 | B2 | 6/2003 | Aschenbeck |
| 6,679,308 | B2 | 1/2004 | Becker et al. |
| 6,790,307 | B2 | 9/2004 | Elliott |
| 6,933,007 | B2 | 8/2005 | Fensel et al. |
| 7,026,013 | B2 | 4/2006 | Deruelle et al. |
| 7,141,303 | B2 | 11/2006 | Clemens et al. |
| 7,241,500 | B2 | 7/2007 | Shiao et al. |
| 7,344,758 | B2 | 3/2008 | Franchina et al. |
| 7,422,989 | B2 | 9/2008 | Kalkanoglu et al. |
| 7,442,270 | B2 * | 10/2008 | Bartek ............ B32B 11/04 156/278 |
| 7,452,598 | B2 | 11/2008 | Shiao et al. |
| 7,470,818 | B2 | 12/2008 | Peng et al. |
| 7,485,594 | B2 | 2/2009 | Saha et al. |
| 7,566,480 | B2 | 7/2009 | Dams |
| 7,592,489 | B2 | 9/2009 | Miller et al. |
| 7,638,164 | B2 | 12/2009 | Aschenbeck |
| 7,641,959 | B2 | 1/2010 | Joedicke |
| 7,674,928 | B2 | 3/2010 | Peng et al. |
| 7,648,755 | B2 | 7/2010 | Gross et al. |
| 7,815,816 | B2 | 10/2010 | Peng et al. |
| 7,854,801 | B2 | 12/2010 | Nemeh et al. |
| 2004/0071938 | A1 | 4/2004 | Fensel et al. |
| 2005/0072114 | A1 | 4/2005 | Hong et al. |
| 2006/0014879 | A1 | 1/2006 | Nemeh et al. |
| 2006/0251807 | A1 | 11/2006 | Hong et al. |
| 2007/0029085 | A1 | 2/2007 | Panga et al. |
| 2007/0054129 | A1 | 3/2007 | Kalkanoglu et al. |
| 2007/0065640 | A1 | 3/2007 | Joedicke |
| 2007/0110961 | A1 * | 5/2007 | Fensel ............ B32B 37/24 428/143 |
| 2007/0173426 | A1 | 7/2007 | Longoria et al. |
| 2007/0213207 | A1 | 9/2007 | Saha et al. |
| 2008/0038513 | A1 | 2/2008 | Grube et al. |
| 2008/0115444 | A1 | 5/2008 | Kalkanoglu et al. |
| 2008/0229976 | A1 | 9/2008 | Amos et al. |
| 2008/0241472 | A1 | 10/2008 | Shiao et al. |
| 2008/0277056 | A1 | 11/2008 | Kalkanoglu et al. |
| 2008/0281054 | A1 | 11/2008 | Danzebrink et al. |
| 2009/0038510 | A1 | 2/2009 | Acosta et al. |
| 2009/0087670 | A1 | 4/2009 | Peng et al. |
| 2009/0133738 | A1 | 5/2009 | Shiao et al. |
| 2009/0220700 | A1 | 9/2009 | Peres |
| 2009/0286885 | A1 | 11/2009 | Qiu et al. |
| 2010/0003737 | A1 | 1/2010 | Murphy et al. |
| 2010/0018706 | A1 | 1/2010 | Fan et al. |
| 2011/0052874 | A1 | 3/2011 | Zhou et al. |
| 2011/0081537 | A1 | 4/2011 | Sexauer et al. |
| 2011/0086201 | A1 | 4/2011 | Shiao et al. |

FOREIGN PATENT DOCUMENTS

| | | |
|---|---|---|
| GB | 1380907 A | 1/1975 |
| WO | 1996002595 A1 | 2/1996 |
| WO | 2006028854 A1 | 3/2006 |
| WO | 2006133384 A2 | 12/2006 |
| WO | 2007011593 A1 | 1/2007 |
| WO | 2008060352 A1 | 5/2008 |
| WO | 2008076279 A1 | 6/2008 |
| WO | 2008147972 A2 | 12/2008 |
| WO | 2011082374 A1 | 7/2011 |
| WO | 2011082398 A1 | 7/2011 |

OTHER PUBLICATIONS

U.S. Appl. No. 13/045,167, filed Mar. 10, 2011.
C.Y. Chen et al., "Preparation of mullite by the reaction sintering of kaolinite and alumina," Journal of the European Ceramic Society, 20 (2000) pp. 2519-2525.
V. Viswabaskaran et al., "Mullitisation behaviour of calcined clay-alumina mixtures," Ceramics International, 29 (2003), pp. 561-571.
N.C. Schieltz and M.R. Soliman, "Thermodynamics of the Various High Temperature Transformations of Kaolinite," Thirteenth National Conference of Clays and Clay Minerals (1966), pp. 419-428.
I.A. Aksay et al., "Mullite for Structural, Electronic, and Optical Applications," J. Am. Ceram. Soc. (1991), 74 [10], pp. 2343-2358.
U.S. Appl. No. 13/538,288, filed Jun. 29, 2012; 33 pages.
Souza et al, "Characteristics and physical-mechanical properties of fired kaolinitic materials", Ceramica, Apr./May/Jun. 2002, vol. 48, Iss. 306, pp. 102-107.
Catarino et al, "Ceramic products obtained from rock wastes", Journal of Materials Processing Technology, Dec. 20, 2003, vol. 143-144, pp. 843-845.
Ikeda et al, "Influence of firing temperature on frost resistance of roofing tiles", Journal of the European Ceramic Society, Nov. 2004, vol. 24, Iss. 14, pp. 3671-3677. Abstract only available; 1 page.
International Report on Patentability for International Appl. No. PCT/US10/62630 dated Jul. 4, 2012; 6 pages.
International Report on Patentability for International Appl. No. PCT/US11/20044 dated Jul. 4, 2012; 8 pages.
Munro et al., Aug. 1999, Correlation of Fracture Toughness and Strength, J. Am. Ceram. Soc. vol. 82 (No. 8); 3 pages.

(56) References Cited

OTHER PUBLICATIONS

Meng et al., 1998, "Microstructure and Mechanical Properties of Mullite Ceramics Containing Rodlike Particles," Journal of the European Ceramic Society 18; 8 pages.
Anggono, Jan. 2005, "Mullite Ceramics: Its Properties, Structure, and Synthesis"; 11 pages.
Weems, J.B. (1903) "Chemistry of Clays" Iowa Geological Survey Annual Report: vol. 14; 28 pages.

* cited by examiner

ASPHALTIC MEMBRANE WITH MULLITE-CONTAINING GRANULES

This application is a continuation application of U.S. application Ser. No. 15/385,102 filed on Dec. 20, 2016, which claims the benefit of U.S. application Ser. No. 13/538,244 filed on Jun. 29, 2012, which is a continuation application of PCT/US2010/062630 filed on Dec. 31, 2010, and claims the benefit of U.S. Provisional Application Ser. No. 61/291,546 filed on Dec. 31, 2009, which are incorporated herein by reference.

FIELD OF THE INVENTION

Embodiments of the present invention are directed toward roofing articles that carry (i.e. are coated with) mullite-containing granules.

BACKGROUND OF THE INVENTION

Asphaltic roofing membranes, also known as bituminous membranes, have been employed to cover flat or low-sloped roofs. These membranes are typically installed by unrolling a roll of material on a roof surface and then heat seaming adjacent membranes together to form an impervious water barrier on the roof surface.

As part of the manufacturing process, the asphaltic roofing membranes are often coated with granular material. Among the benefits associated with the use of these granules is the ability to reflect and/or block solar radiation, which includes ultraviolet, visible, and infrared radiation, to thereby maintain a cooler roof surface. Other benefits include optional color, weatherability, and fire resistance. It is believed that by increasing the reflectivity of the roofing surface, energy savings can be achieved. There is, therefore, a desire to increase the reflectivity of roofing surfaces, particularly those that are covered with asphaltic membrane. Incremental improvements in reflectivity translate into energy savings for the consumer while also providing environmental benefits.

Conventionally, granules for roofing applications have been comprised of inert mineral particles. U.S. Pat. No. 7,241,500 discloses that "suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled manufactured materials such as crushed bricks, concrete, porcelain, fire clay, and the like".

Typically granules used for roofing applications are of a standard size, and may be classified as full grade or No. 11 grade which, according to U.S. Pat. No. 6,238,794, corresponds to −10/+35 U.S. mesh size. Alternatively, as stated in U.S. Pat. No. 6,933,007, industry standard granules are typically referred to as 8×40 U.S. mesh whereas the average particle size corresponds to about 19 US mesh (i.e. 0.937 mm sieve opening). U.S. Pat. No. 7,241,500 describes the mineral particles, which can be produced by a series of quarrying, crushing, and screening operations, as having a size generally intermediate between sand and gravel, or between about 8 US mesh and 70 US mesh.

U.S. Pat. No. 3,169,075 discloses conventional mineral roofing granules surfaced with a coating comprised of calcined kaolin, a pigment such as titanium dioxide, and an alkali silicate to form a vitreous coating. U.S. Pat. No. 6,933,007 discloses as background that kaolin clay is used extensively in silicate paint formulations for coloring roofing granules, serving as a filler, extender, moisture release agent, and reactant to aid film insolubilization during high temperature firing. However, as further stated in U.S. Pat. No. 6,933,007, kaolin clay alone lacks the brightness and opacity needed to hide the dark underlying base rock of the granule and frequently require appreciable amounts of $TiO_2$ to achieve desired color specifications. U.S. Publication No. 2010/0203336 discloses uncalcined kaolin dispersed with binder and solar reflective particles (such as $TiO_2$) to provide roofing granules which are then cured from about 500 to 800° C. The prior art does not contemplate reflective roofing granules or coatings for granules comprised of additive-free calcined kaolin.

SUMMARY OF THE INVENTION

One or more embodiments of the present invention provide a roofing article comprising (i) an asphaltic substrate; and (ii) a plurality of mullite-containing granules disposed on a surface of the substrate, where said mullite-containing granules include a mullite concentration of at least 35 wt % and at most 63 wt % as determined by quantitative x-ray diffraction.

One or more embodiments of the present invention provide a roofing article comprising (i) an asphaltic substrate; and (ii) a plurality of mullite-containing granules disposed on a surface of the substrate, said granules characterized by an grain size of about 0.05 µm.

One or more embodiments of the present invention provide a composition suitable for roofing granules characterized by a solar reflectance of at least 30%, wherein the composition is further characterized by a mullite phase content of at least 35 wt % and at most 60 wt % as determined by quantitative x-ray diffraction and a mullite crystallite size of at least 25 nm and at most 65 nm as determined by x-ray diffraction line broadening of the isolated (110) diffraction peak.

One or more embodiments of the present invention provide an asphaltic membrane comprising (i) an asphaltic substrate; and (ii) a plurality of mullite-containing granules disposed on a planar surface of the substrate, where the mullite-containing granules include mullite-crystallites dispersed within a non-mullite matrix, and where the mullite-containing granules include less than 3.5 wt. % alkali oxides or alkaline earth oxides combined.

DETAILED DESCRIPTION OF ILLUSTRATIVE EMBODIMENTS

Embodiments of the present invention are based, at least in part, on the discovery of asphaltic membranes having a technologically useful reflectivity to solar radiation that include a plurality of mullite-containing granules characterized by a tailored mullite concentration, a tailored mullite crystallite size, or both a tailored mullite concentration and a tailored mullite crystallite. These articles are advantageously characterized by exhibiting a high degree of solar reflectivity (e.g. panel reflectivity). While the prior art contemplates the use of aluminosilicates for roofing granules, it has unexpectedly been discovered that not all aluminosilicates provide the desired performance and that the mullite concentration and mullite crystallite size of mullite-containing granules are critical parameters to achieving desired panel reflectivity. In these or other embodiments, it has unexpectedly been discovered that the aspect ratio of the mullite crystallites within the mullite-containing granules plays an important role in achieving desired panel reflectivity. Without being bound by theory, it is believed that enhanced reflectivity of the granules occurs due to increased light scattering at interfaces, such as at the mullite crystallite boundaries and mullite crystallite/non-mullite matrix boundaries.

Structure

In one or more embodiments, the asphaltic membranes of the one or more embodiments of the present invention include an asphaltic substrate having two major planar surfaces. The two planar surfaces may be referred to as first and second planar surfaces, or in other embodiments, as an upper surface and a lower surface. At installation and during use, the upper surface is positioned toward the environment while the lower surface is positioned toward the roof structure onto which the membrane is installed.

In one or more embodiments, the upper surface of the membrane carries a plurality of granules. Accordingly, reference may be made to a coated asphaltic membrane. Stated another way, a first planar surface of the membrane is coated with a plurality of granules. These granules are generally affixed to the upper surface of the membrane through adhesive forces offered by the asphaltic substrate.

In one or more embodiments, the granules as applied to the substrate are characterized by a surface coverage of at least 85%, in other embodiments at least 90%, in other embodiments at least 95%, or at least 96%, or at least 97%, or at least 98%, or at least 98.5% or at least 99%, or at least 99.5%. In one of more embodiments, surface coverage is determined optically by image analysis as is known in the art.

In one or more embodiments, the roofing articles of the present invention include a bituminous substrate including a first and second planar surface. The first planar surface is substantially coated with granules. The second planar surface is coated, as is known in the art, with non-stick surface. Examples of non-stick surface coatings include, but are not limited to, release liners and sand. In one or more embodiments, the roofing articles of the present invention include a second planar surface that is coated with sand.

Asphaltic Substrate

Practice of the present invention is not necessarily limited by the choice of asphaltic substrate, which may also be referred to as a bituminous membrane or asphaltic membrane. Any asphaltic substrate currently used in the roofing art can be used in practice of the present invention. In particular embodiments, the substrate includes a roofing shingle, which is conventionally used on residential buildings with relatively high-sloped roofs. In other embodiments, the asphaltic substrate includes modified asphalt membranes, which includes those membranes that are conventionally used on commercial buildings that have flat or low-sloped roofs. Examples of modified asphalt membranes are disclosed in U.S. Pat. Nos. 4,835,199, 4,992,315, 6,486, 236, 6,492,439, 6,924,015, 7,070,843, 7,146,771, and 7,442, 270, which are incorporated herein by reference.

In one or more embodiments, the asphaltic sheet includes a reinforcing fabric coated with an asphaltic-based composition. The fabric, or reinforcing sheet, may be woven or non-woven as is known in the art. Non-limiting examples of such fabric, also known as a scrim or fiberglass mesh sheet, include scrims that are commercially available. For example, fiberglass scrims are available under the trade name STYLE™ 930120 (Milliken & Co.; Spartanburg, S.C.) and also available from J. P. Stevens (Greenville, S.C.). In other embodiments, the reinforcing sheet may be an organic felt.

In one or more embodiments, asphaltic composition includes asphalt or bitumen, optionally polymer, and optionally other additives such as those conventionally employed in the art. Where a polymer is present in the composition, the asphaltic substrate may be referred as a polymer-modified membrane. The polymer modifier may be polymers or rubbers as known in the art. Non-limiting examples of such polymer modifiers include styrene butadiene rubber (SBR) or atactic polypropylene (APP).

Granules

Mullite Concentration

In one or more embodiments, the mullite-containing granules (which may be referred to simply as granules) employed in practicing the present invention include crystallites of mullite (which may also be referred to as mullite crystallites) dispersed within a matrix that includes non-mullite aluminosilicates, non-mullite siliceous materials, or both non-mullite aluminosilicates and non-mullite siliceous materials.

The term mullite is used in a conventional manner. As those skilled in the art appreciate, mullite refers to a subset of crystalline aluminosilicates. Mullite can be represented by the stoichiometric forms $3Al_2O_3.2SiO_2$ and $2Al_2O_3.SiO_2$, or more generally as $Al_2[Al_{2+2x}Si_{2-2x}]O_{10-x}$ where $0.18 \leq x \leq 0.88$. As is known in the art, mullite can be identified by x-ray diffraction, and standard x-ray diffraction patterns for mullite are well known (for example, published by U.S. Department of Commerce, National Bureau of Standards, U.S. Government Printing Office, 1964).

In one or more embodiments, the mullite-containing granules employed in the practice of this invention include a certain amount of mullite, which amount may be referred to as mullite concentration. In one or more embodiments, the granules employed in practice of this invention include at least 35 wt %, in other embodiments at least 37 wt %, in other embodiments at least 40 wt %, in other embodiments at least 42 wt %, in other embodiments at least 45 wt %, in other embodiments at least 47 wt % by weight mullite, and in other embodiments at least 50 wt % mullite, as determined by wide angle powder x-ray diffraction. In these or other embodiments, the granules employed in practice of this invention include at most 63 wt %, in other embodiments at most 60 wt %, in other embodiments at most 58 wt %, in other embodiments at most 57 wt %, and in other embodiments in other embodiments at most 55 wt % mullite, as determined by wide angle powder x-ray diffraction. In one or more embodiments, the granules include from about 35 to about 63 wt %, in other embodiments from about 40 to about 57 wt %, and in other embodiments from about 45 to 55 wt % mullite, as determined by wide angle powder x-ray diffraction.

Mullite Size and Geometry

In one or more embodiments, the mullite crystallites may have a platelet shape, in other embodiments, they may have a needle shape, and in certain embodiments, the granules may include a blend of platelet shaped mullite crystallites and needle-shaped mullite crystallites.

In one or more embodiments, the mullite crystallite size, as determined by the isolated (110) x-ray diffraction peak (which may correspond to a shorter dimension of the crystal), is at least 25 nm, in other embodiments at least 30 nm, in other embodiments at least 33 nm, and in other embodiments at least 35 nm. In these or other embodiments, the mullite crystallite size, as determined by the isolated (110) x-ray diffraction peak, is at most 65 nm, in other embodiments at most 57 nm, in other embodiments at most 60 nm, and in other embodiments at most 55 nm. In one or more embodiments, the average crystallite size, as determined by the isolated (110) x-ray diffraction, is from about 25 nm to about 65 nm, in other embodiments from about 30 nm to about 60 nm, and in other embodiments from about 35 nm to about 55 nm.

In one or more embodiments, the crystallite size, as determined by the isolated (001) x-ray diffraction peak (which may correspond to a longer dimension of the crystal), is at least 50 nm, in other embodiments at least 55 nm, in other embodiments at least 60 nm, and in other embodiments at least 65 nm. In these or other embodiments, the crystallite size, as determined by the isolated (001) x-ray diffraction peak, is at most 1000 nm, in other embodiment at most 700 nm, in other embodiments at most 400 nm, in other embodiments at most 200 nm, in other embodiments at most 150 nm, in other embodiments at most 100 nm, in other embodiments at most 90 nm, and in other embodiments at most 85 nm. In one or more embodiments, the average crystallite size, as determined by the isolated (001) x-ray diffraction peak, is from about 50 nm to about 100 nm, in other embodiments from about 55 nm to about 90 nm, and in other embodiments from about 60 nm to about 85 nm. In some instances, the upper limit for determination of crystallite size is 100 nm for some instrumentation, but scanning electron micrographs can be utilized to corroborate crystallite dimensions greater than 100 nm.

In one or more embodiments, the aspect ratio of the mullite crystallites, which refers to the ratio of the mullite crystallite size by the isolated (001) x-ray diffraction peak to the mullite crystallite size by the isolated (110) x-ray diffraction peak (i.e. the longest dimension to the shortest dimension) may be at least 1.5, in other embodiments at least 1.6, in other embodiments at least 1.7 in other embodiments at least 1.8, in other embodiments at least 1.9, and in other embodiments at least 2.0.

As used herein, the mullite crystallite size is measured by x-ray diffraction line broadening techniques, as are known in the art. See, for example, U.S. Pat. No. 3,989,783 and J. I. Langford and A. J. C. Wilson, "Scherrer after Sixty Years: A Survey and Some New Results in the Determination of Crystallite Size," *J. Appl. Cryst.* 11 (1978) pp 102-113.

As is known in the art, the mullite crystallite size can be calculated based on the theory of line broadening of diffraction line by fine grain size, as described by the Scherrer equation (Equation 1), whereby peak width (B) is inversely proportional to crystallite size (L):

$$B(2\theta) = \frac{K\lambda}{L\cos\theta} \qquad \text{(Eq. 1)}$$

where, B is the diffraction broadening at full width at half maximum (a.k.a FWHM); K is the Scherrer constant (assumed to be 0.94 for these calculations); L is the thickness of the crystallite perpendicular to the selected crystal plane, and θ is the angle of incident X-ray radiation. The breath (B) refers the broadening due to the particle size effect alone and is the width of the diffraction peak at one-half of the maximum intensity (full width at half maximum, or FWHM). By way of example, diffraction patterns can be generated using X-ray Diffractometer (Siemens D500 Goniometer, Cu—Kα radiation, Phillips) and an analyzing range from 5° to 70° 2θ with 0.04° step size and 4 second dwell (count time). Phase identification and profile fitting can be conducted using commercial software routines (e.g. Jade+, Version 10.1, Materials Data, Inc., Livermore, Calif., 1995). As those skilled in the art recognize, mullite grains may grow with a needle-like or acicular habit. Therefore, for the analysis of mullite crystallite size, the mullite diffraction peaks at 16.4° 2θ (110) (representing the smallest dimension) and 30.9° 2θ (001) (representing the longest dimension) were used to calculate the grain size in two different directions.

Granule Matrix

As discussed above, the mullite crystallites are dispersed within non-mullite aluminosilicates and/or non-mullite siliceous materials. These non-mullite materials may be referred to as a matrix in which the mullite crystallites are dispersed.

The term aluminosilicate is used in a conventional manner. In general, these materials include alumina ($Al_2O_3$) and silica ($SiO_2$), and include compositions that are substantially alumina or substantially silica, although with respect to the latter, the term siliceous material may also be employed. See, for example, S. Aramaki & R. Roy in "Revised Phase Diagram for the System $Al_2O_3$—$SiO_2$" Journal of the American Ceramic Society, 45, Issue 5, pages 229-242, published May, 1962 and by R. Davis & J. Pask in "Diffusion and Reaction Studies in the System $Al_2O_3$—$SiO_2$" Journal of the American Ceramic Society, 55, Issue 10, pages 525-531, published October, 1972, which are incorporated herein by reference.

In one or more embodiments, the matrix includes amorphous material, which as those skilled in the art appreciate, refers to non-crystalline materials such as glassy silica. In one or more embodiments, these amorphous materials lack long-range order typical of crystalline materials. In one or more embodiments, the matrix includes polymorphs of silica, amorphous silica, or combinations thereof.

In one or more embodiments, at least 50 wt %, in other embodiments at least 60 wt %, in other embodiments at least 70 wt %, in other embodiments at least 80 wt %, in other embodiments at least 90 wt %, and in other embodiments at least 95 wt % of the matrix is amorphous.

Granule Chemical Composition

In one or more embodiments, the mullite-containing granules include a major amount of alumina and silica. Alumina may be referred to as aluminum oxide or $Al_2O_3$, and silica may be referred to as silicon dioxide or $SiO_2$. In one or more embodiments, the granules include at least 90 wt %, in other embodiments at least 93 wt %, in other embodiments at least 95 wt %, in other embodiments at least 96 wt %, in other embodiments at least 97 wt %, in other embodiments at least 98 wt %, and in other embodiments at least 99 wt % silica and alumina combined.

In one or more embodiments, the mullite-containing granules include at least 35 wt %, in other embodiments at least 40 wt %, and in other embodiments at least 42 wt % alumina. In these or other embodiments, the granules include at most 55 wt %, in other embodiments at most 50 wt %, and in other embodiments at most 45 wt % alumina.

In these or other embodiments, the mullite-containing granules include at least 40 wt %, in other embodiments at least 45 wt %, in other embodiments at least 49 wt %, and in other embodiments at least 54 wt % silica. In these or other embodiments, the granules include at most 65 wt %, in other embodiments at most 60 wt %, and in other embodiments at most 55 wt % silica.

In one or more embodiments, the mullite-containing granules include less than 5 wt % total combined weight of elements or compounds (such as oxides) other than alumina and silica. These elements or compounds include potential impurity metal oxide components such as, but not limited to, oxides such as $Fe_2O_3$, $TiO_2$, $K_2O$, MgO, CaO, $P_2O_5$, or trace levels in oxide form of compounds containing Ba, Sr, Zr. In one or more embodiments, the granules include less than 4 wt %, in other embodiments less than 3 wt %, and in other embodiments less than 2 wt % total combined weight of elements or compounds (such as oxides) other than alumina and silica.

In one or more embodiments, the mullite-containing granules includes less than 3.5 wt %, in other embodiments less than 3.0 wt %, in other embodiments less than 2.5 wt %, in other embodiments less than 2 wt %, in other embodiments less than 1.5 wt %, and in other embodiments less than 1.0 wt % alkali oxides (RO) or alkaline earth oxides ($R_2O$) combined. In one or more embodiments, the granules are essentially devoid of alkali oxides or alkaline earth oxides. For example, alkali oxides include, but are not limited to, BaO (Barium Oxide, Baria), CaO (Calcia, Calcium Oxide), MgO (Magnesium Oxide, Magnesia), PbO (Lead Oxide), SrO (Strontium Oxide, Strontia), and ZnO (Zinc Oxide). And, for example, alkaline earth oxides include, but are not limited to, $K_2O$ (Potassium Oxide), $Li_2O$ (Lithium Oxide, Lithia), and $Na_2O$ (Sodium Oxide, Soda). As is generally known, alkali oxides and alkaline earth oxides are fluxing oxides, which may act to lower the melting point of refractory oxides such as silica and alumina.

As is known in the art, the chemical composition of aluminosilicate granules may be determined by ICP-ES (inductively coupled plasma emission spectroscopy) or other suitable techniques for determining oxide content. Unless otherwise noted, percentages are in weight percent for normalized oxide equivalent.

Granule Size & Size Distribution

In one or more embodiments, mullite-containing granules having a particular size are employed. The size of the granules, which may also be referred to as agglomerate size or as particle size, refers to largest axis (e.g., diameter of a spherical particle) of the granule, which may also be referred to as equivalent spherical diameter. In one or more embodiments, the mullite-containing granules are characterized by a size of from about −3½ to about +70 mesh, or in other embodiments from about −4 to about +35 mesh. In other words, the particles, on average, are of sufficient size so that 90% or more of the material will pass through a 3½-mesh sieve (particles smaller than 5.66 mm) and be retained by a 70-mesh sieve (particles larger than 0.210 mm). In one or more embodiments, the size of the granules corresponds to full grade or No. 11 grade.

In one or more embodiments, the granules are characterized by a number average particle size of less than 10 mm, in other embodiments less than 3 mm, in other embodiments less than 1 mm, and in other embodiments less than 500 microns. In these or other embodiments, the granules are characterized by an average particle size of at least 10 μm, in other embodiments at least 100 μm, and in other embodiments at least 200 μm.

As is known in the art, particle size distribution may be determined by several techniques. These techniques include, but are not limited to, sieve analysis, sedimentation analysis, and light scattering techniques. The particle size distribution (PSD) may include reference to equivalent spherical diameter (ESD). Median particle size is the value, $d_{50}$, at which there are 50% by weight of the particles present in the composition having an ESD less than that value. Unless noted otherwise, the percentages and amounts expressed herein are by weight.

Granule Geometry

In one or more embodiments, the mullite-containing granules are characterized by having a blocky, or plate-like, structure. In these or other embodiments, the plate-like structure refers to a geometry where one axis (e.g., z axis) is substantially smaller than the other axes (e.g., x and y axes) of the granule. In one or more embodiments, the x and/or y axes are at least 1.5, or at least 2, or at least 3. The aspect ratio may be determined by optical microscopy techniques in conjunction with image analysis as is known in the art.

Miscellaneous Properties

In one or more embodiments, the mullite-containing granules employed in practicing the present invention may be relatively porous or, in other embodiments, relatively non-porous. Porosity as measured by mercury porosimetry techniques known in the art is employed to characterize the open porosity inherent in the granules. Surprisingly, as will be discussed further in the next section, porosity did not contribute greatly to the superior reflectivity of the articles of the invention. In one or more embodiments, the porosity of the granules as measured using Hg-porosimetry is greater than or equal to zero (0 ml/g), in other embodiments greater than 0.01 ml/g, in other embodiments greater than 0.02 ml/g, in other embodiments greater than 0.03 ml/g, in other embodiments greater than 0.04 ml/g. In one or more embodiments, the porosity of the granules is less than 0.25 ml/g, in other embodiments less than 0.20 ml/g, in other embodiments greater than 0.19 ml/g, in other embodiments greater than 0.18 ml/g, and in other embodiments greater than 0.16 ml/g.

In one or more embodiments, the mullite-containing granules are characterized by being white in color. In one or more embodiments, the granules have an L* value of at least 75, in other embodiments at least 80, and in other embodiments at least 85. As those skilled in the art appreciated, the color of granules may be measured to determine L-value by using standard instrumentation such as Hunter L,a,b (Hunter Associates Laboratory, Inc., Reston, Va.) or CIELAB L*, a*, b* (CIELAB, 1976). Values for "L*" indicate the ratio of light to dark. Values for "a" refer to the redness-greenness coordinate in certain transformed color spaces, generally used as the difference in "a" between a specimen and a standard reference color. If "a" is positive, there is more redness than greenness; if "a" is negative, there is more greenness than redness. It is normally used with b as part of the chromaticity or chromaticity color difference. Values for "b" refer to the yellowness-blueness coordinate in certain color spaces, generally used as the difference in "b" between a specimen and a standard reference color, normally used with "a" or a as part of the chromaticity difference. Generally, if "b" is positive, there is more yellowness than blueness; if "b" is negative, there is more blueness than yellowness. For a description of the Hunter Color test methods, see Billmeyer, Jr. et al., *Principles of Color Technology*, John Wiley & Sons, $2^{ED}$ (1981), which is incorporated herein by reference.

In one or more embodiments, the mullite-containing granules are characterized by including grains having an average grain size of at least about 0.01 µm, or at least about 0.05 µm, or at least about 0.1 µm, or at least about 0.5 µm, or at least about 1 µm. In these or other embodiments, the average grain size is less than about 100 µm, or less than about 50 µm, or less than about 20 µm, or less than about 10 µm, or less than about 5 µm.

In one or more embodiments, the mullite-containing granules are characterized by a visible light (about 400 to about 700 nm) reflectivity of at least 70%, in other embodiments at least 75%, in other embodiments at least 80%, in other embodiments at least 85%, and in other embodiments at least 90%. In one or more embodiments, the granule are characterized by a UV electromagnetic radiation (about 10 nm to about 400 nm) reflectivity of at least 70%, in other embodiments at least 75%, in other embodiments at least 80%, in other embodiments at least 85%, and in other embodiments at least 90%. In one or more embodiments, the granules are characterized by an infrared electromagnetic radiation (about 700 nm to about $10^{-3}$ m) reflectivity of at least 70%, in other embodiments at least 75%, in other embodiments at least 80%, in other embodiments at least 85%, and in other embodiments at least 90%. In one or more embodiments, the granules are characterized by a terrestrial solar radiation (about 250 nm to about 2500 nm) reflectivity of at least 70%, in other embodiments at least 75%, in other embodiments at least 80%, in other embodiments at least 85%, and in other embodiments at least 90%. For purposes of this specification, terrestrial solar radiation refers to the solar radiation contacting sea level. In one or more embodiments, the bituminous substrates applied with granules of the invention are characterized by panel solar reflectance of at least 65%, in other embodiments at least 70%, in other embodiments at least 75%, in other embodiments at least 80%, in other embodiments at least 85%, and in other embodiments at least 90%.

In one or more embodiments, the mullite-containing granules are characterized by a reflectivity according to ASTM C1549 of at least 60%, in other embodiments at least 65%, in other embodiments at least 70%, in other embodiments at least 72%, in other embodiments at least 75%, in other embodiments at least 80%, in other embodiments at least 85%, and in other embodiments at least 90%.

In one or more embodiments, the mullite-containing granules are characterized as being chemically inert, which refers to the fact that the granules are stable to chemical conditions conventionally experienced on a roof surface. In one or more embodiments, the granules are insoluble in water, which refers to a solubility of 0.01 gram per liter or less at standard conditions of temperature and pressure and a pH of 7. In one or more embodiments, the granules are insoluble in water under acidic conditions, which refers to a solubility of 0.01 gram per liter or less at standard conditions of temperature and pressure and a pH of 5 or less, or in other embodiments at a pH of 4 or less, or in other embodiments at a pH of 3 or less, or in other embodiments at a pH of 2 or less. In these or other embodiments, the granules are insoluble in water under basic conditions, which refers to a solubility of 0.01 gram per liter or less at standard conditions of temperature and pressure and a pH of 8 or more, or in other embodiments at a pH of 9 or more, or in other embodiments at a pH of 10 or more, or in other embodiments at a pH of 11 or more.

Source and Manufacture of Granules

Practice of one or more embodiments of the present invention is not limited by the source of the mullite-containing granules or method by which the granules may be fabricated. In one or more embodiments, the mullite-containing granules are obtained by calcination of kaolin clay. The product of calcination may be referred to as calcined kaolin.

As those skilled in the art appreciate, kaolin exists naturally in the hydrous form. In the hydrous form, kaolinite minerals form crystal structures that are linked together by hydroxyl containing moieties. Hydrous kaolin may be converted to calcined kaolin containing a desired amount of mullite by thermal processes. It is believed that these processes result in a dehydroxylation of the kaolin and an aggregation of the particles that converts the crystal structure to an amorphous form.

Practice of one or more embodiments of the present invention is not limited by selection of particular kaolin to provide or produce the calcined kaolin having the desired mullite characteristics. In one or more embodiments, crude kaolin, coarse hydrous kaolin, or fine hydrous kaolin may be employed. As those skilled in the art appreciate, kaolin may be mined from various geographic locations including North America, Europe, and Asia.

In one or more embodiments, the kaolin may optionally be subjected to preliminary processing and/or beneficiation to facilitate transportation, storage, and handling. For example, crude kaolin can be subjected to one or more of the following operations: crushing, grinding, delamination (wet milling, slurry milling, wet grinding, and the like), filtration, fractionation, pulverization, flotation, selective flocculation, magnetic separation, floc/filtration, bleaching, and the like before or after the heat treatment.

In one or more embodiments, calcination is effected by heat treating hydrous kaolin at temperatures ranging from about 500° C. to about 1300° C. or higher. In one or more embodiments, the calcined kaolin is thermally prepared at a calcination temperature of at least 1000° C. and at most 1300° C. for a time from about 1 second to about 10 hours, or at least 1050° C. and at most 1250° C. for a time from about 1 minute to about 5 hours, or at least 1100° C. and at most 1200° C. for a time from about 10 minutes to about 4 hours. In one or more embodiments, the kaolin is heated to a temperature of about 1175 to 1200° C. for a time of about 1 minute to about 2 hours. Calcined, or calcination as used herein, may encompass any degree of calcination, including partial (meta) calcination, full calcination, flash calcination, or combinations thereof.

Calcining or heat treating may be performed in any suitable manner to provide a major amount of mullite. Heating procedures typically include soak calcining, flash calcining, and/or a combination of flash calcining/soak calcining. In soak calcining, a hydrous kaolin is heat treated at a desired temperature for a period of time (for example, from at least 1 minute to about 5 or more hours), sufficient to dehydroxylate the kaolin and form a major amount of mullite. In flash calcining, a hydrous kaolin is heated rapidly for a period of at most 10 seconds, typically less than about 1 second. In a flash/soak calcining operation, metakaolin is instantaneously produced during flash calcination and then processed to a finished product requirement using soak calcination. Excess calcination to temperatures above for example 1400° C. may not desirable due to mullite crystallite growth outside of desired range.

Practice of one more embodiments of the present invention is not limited by the furnace, kiln, or other heating apparatus used to effect heating of the hydrous kaolin. Known devices suitable for carrying out soak calcining include high temperature ovens, and rotary and vertical kilns. Known devices for effecting flash calcining include toroidal fluid flow heating devices.

Membrane Characteristics

The membranes of one or more embodiments of this invention can achieve a solar reflectance, as defined and determined by the EnergyStar rating or California Title 24 (Cool Roof Rating Council test CRRC-1 in conjunction with ASTM C1549), which reflectance may be referred to as panel reflectance, of at least 60%, in other embodiments at least 65%, in other embodiments at least 67%, in other embodiments at least 69%, in other embodiments at least 70%, in other embodiments at least 72%, and in other embodiments at least 75% reflectivity.

Method of Making Coated Asphaltic Membrane

Practice of one or more embodiments of the present invention is not limited by the method used to manufacture the asphaltic membranes of the present invention. Conventional techniques for forming the asphaltic substrate and applying the granules may be employed. In this regard, U.S. Pat. Nos. 3,169,075 and 6,933,007 are incorporated herein by reference. In one or more embodiments, the mullite-containing granules are applied to a hot asphaltic substrate by gravity (i.e. they are dropped). In particular embodiments, multiple drops are employed, and in other embodiments, the size of the granules that are applied in a subsequent drop step are smaller than the granules applied in a first drop step.

In one or more embodiments, the roofing articles of the present invention are prepared wherein the temperature at which the plurality of granules is provided to the substrate is at least 150° C. and at most 220° C., or at least 160° C. and at most 195° C., or at least 170° C. and at most 185° C.

Industrial Applicability

In one or more embodiments, the coated asphaltic membranes of the present invention may be fabricated into in the form of a sheet that is rolled for storage and transport. Upon installation, these sheets are unrolled and adjacent sheets can be heat welded together or sealed with hot asphalt or cold adhesive to form a water-impervious barrier on the top of the roof. As noted above, a planar surface of the membrane is coated with granules. The coated surface is typically the surface that is exposed to the environment when installed on a roof, and therefore it may be referred to as the top surface. The opposite planar surface, which may be referred to as the bottom surface, is typically not coated with the inventive granules and therefore may be devoid or substantially devoid of granules.

In order to demonstrate the practice of the present invention, the following examples have been prepared and tested. The examples should not, however, be viewed as limiting the scope of the invention. The claims will serve to define the invention.

Examples

Ten samples of ceramic materials (generally aluminosilicates) were obtained and analyzed for various characteristics and properties, and they were further employed as granules on asphaltic test samples to determine their usefulness as a roofing granule. With respect to the latter, the asphaltic samples were analyzed for solar reflectance.

The chemical compositions of the various ceramic samples were analyzed by ICP-ES (inductively coupled plasma emission spectroscopy) techniques, and the results are set forth in Table 1 where values are set forth as weight percent. Samples 1, 2, and 3, were include multiple data points that represent different batches of what was believed to be the same material (e.g. 1a and 1b).

TABLE 1

| Sample No. | $SiO_2$ % | $Al_2O_3$ % | $Fe_2O_3$ % | $TiO_2$ % | $Na_2O$ % | $K_2O$ % | MgO % | CaO % | Sum % |
|---|---|---|---|---|---|---|---|---|---|
| 1a | 54.68 | 44.51 | 0.13 | 0.48 | 0.02 | 0.10 | 0.03 | 0.05 | 100.00 |
| 1b | 52.86 | 46.31 | 0.16 | 0.45 | 0.03 | 0.09 | 0.04 | 0.05 | 100.00 |
| 2a | 55.99 | 41.59 | 0.55 | 0.32 | 0.06 | 1.34 | 0.12 | 0.03 | 100.00 |
| 2b | 55.77 | 41.76 | 0.52 | 0.26 | 0.06 | 1.43 | 0.16 | 0.04 | 100.00 |
| 3a | 55.10 | 41.92 | 1.09 | 0.13 | 0.07 | 1.02 | 0.30 | 0.37 | 100.00 |
| 3b | 55.05 | 42.00 | 1.02 | 0.14 | 0.08 | 1.05 | 0.34 | 0.32 | 100.00 |
| 3c | 55.20 | 41.95 | 1.01 | 0.14 | 0.08 | 1.03 | 0.26 | 0.31 | 100.00 |
| 4 | 56.52 | 40.57 | 0.52 | 0.02 | 0.13 | 1.85 | 0.28 | 0.11 | 100.00 |
| 5 | 54.41 | 43.93 | 0.63 | 0.37 | 0.02 | 0.33 | 0.14 | 0.17 | 100.00 |
| 6 | 52.56 | 43.67 | 0.55 | 0.68 | 0.26 | 1.82 | 0.14 | 0.30 | 100.00 |
| 7 | 40.94 | 56.94 | 0.35 | 1.14 | 0.05 | 0.28 | 0.13 | 0.17 | 100.00 |
| 8 | 0.35 | 99.47 | 0.00 | 0.00 | 0.13 | 0.00 | 0.00 | 0.05 | 100.00 |
| 9 | 72.37 | 20.75 | 0.66 | 0.78 | 0.97 | 3.95 | 0.16 | 0.35 | 100.00 |
| 10 | 43.91 | 50.01 | 0.66 | 0.74 | 0.86 | 3.31 | 0.19 | 0.32 | 100.00 |

Samples 1 through 5 were believed to be calcined kaolin clays that were calcined at a temperature of about 1175 to 1200° C. for 15 min to 2 hours. Specifically, Samples 1-3 were believed to derive from industrial scale batch calcinations performed in rotary kilns. Samples 4-5 were clays that were calcined within a Thermolyne 46200 High Temperature Furnace (heating element molybdenum disilicide) or a Carbolite RHF 1500 Furnace (heating element silicon carbide). Samples 6 and 7 were commercially available (C-E Minerals, King of Prussia, Pa.) refractory materials, which were believed to be sintered mullites. Specifically, Sample 6 was believed to correspond to M45, which is a sintered mullite with chemical composition corresponding to an alumina content of approximately 45% $Al_2O_3$. Sample 7 was believed to correspond to M60, which is a sintered mullite with chemical composition corresponding to an alumina content of approximately 60% $Al_2O_3$. Sample 8 was a commercially available tabular alumina (AluChem, Cincinnati, Ohio). Samples 9 and 10 were commercially available electrical insulator porcelains (Victor Insulators, Inc., Victor, N.Y.), although as shown in Table 1, Sample 9 was richer is silica while Sample 10 was richer in alumina. Samples 2 through 5 are representative of the present invention, while Samples 1 and 6 through 10 are comparative examples.

Characterization studies of Samples 1 through 10 were performed and data is presented on Tables 2 and 3. The characteristics, properties, and solar reflectance of each Sample are set forth in Table 2. Further data related to aspect ratio for mullite phase crystallites are included in Table 3 together with the morphology data based upon the granule aspect ratio.

Figure 1:
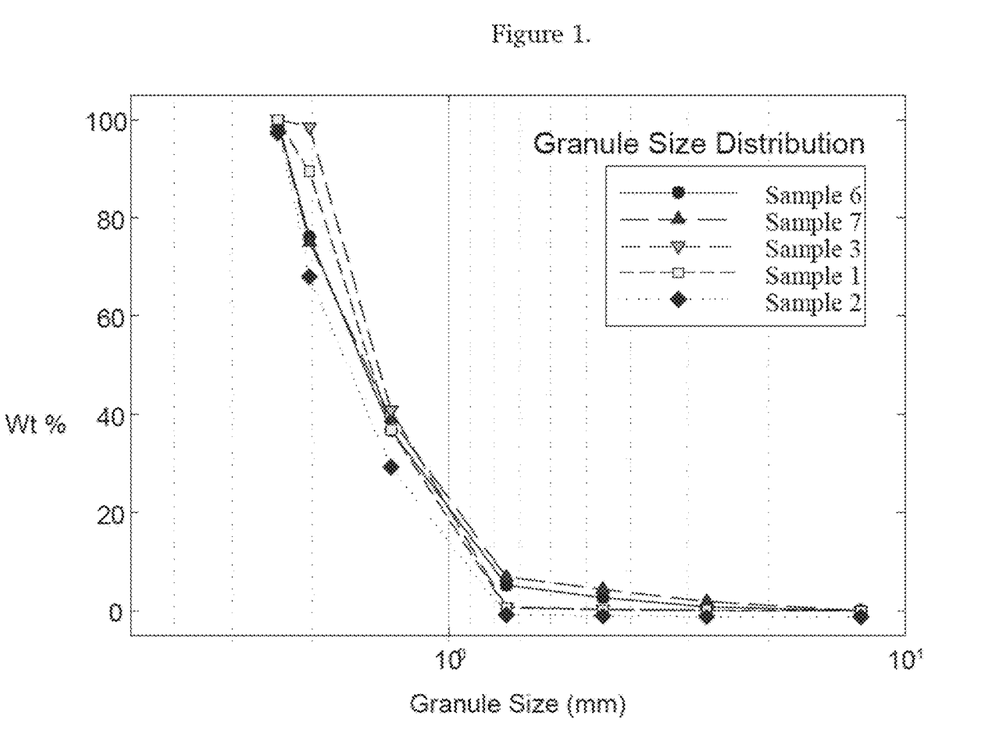
FIG. 1 is a cumulative percentage representation for Samples 2 & 3 of the invention and comparative Samples 1, 5, & 6.
Figure 2:
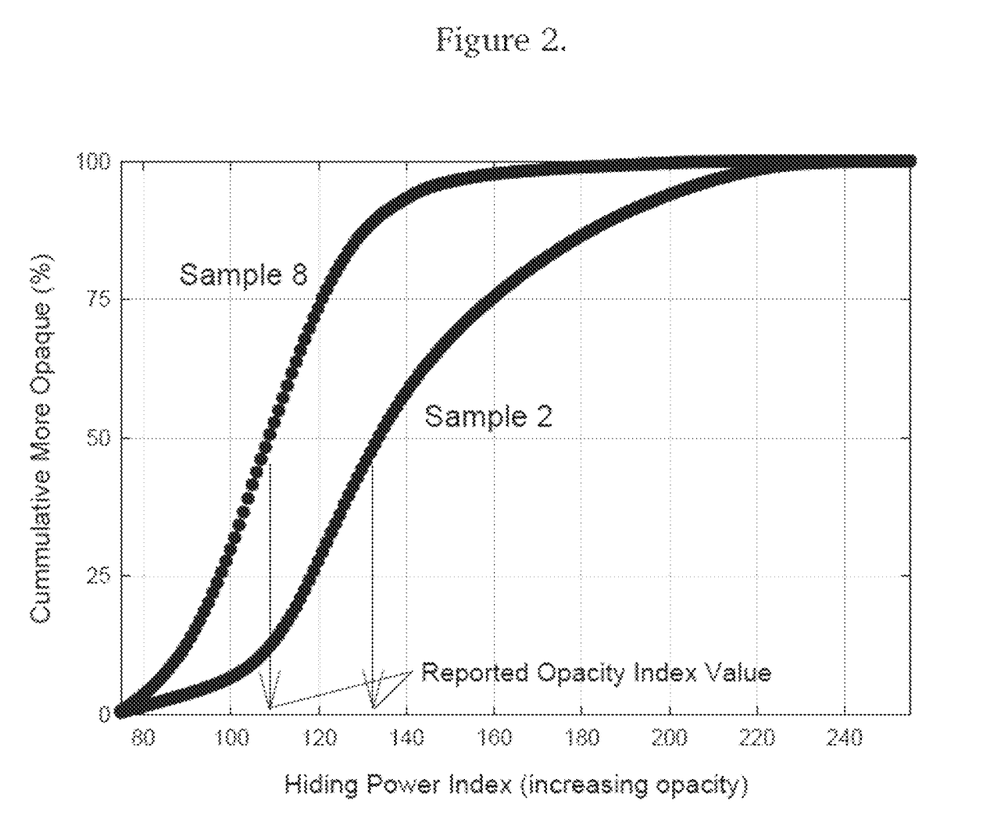
FIG. 2 is a graph of cumulative hiding power (opacity) and mean index values for Sample 2 of the invention and comparative Sample 8.

The enlarger was equipped with a 50 mm lens, an f-stop of 22, and a nominal exposure time of eleven (11) seconds. The processed image consisted of white-gray regions where the granules were located against a black background. These images were scanned using a desktop scanner (HP 8200 Flatbed scanner) and then converted to jpeg image format; subsequently, the images were evaluated using image processing software (LabView, v. 5.1). Results were produced in the form of an Excel spreadsheet with the number of pixels in each gray-scale as 256 data pairs. Between 800 and 2000 grains were measured for each index value. In this analysis, a low number indicated black and a high number indicated white. The greater the value, the higher the hiding power. In this analysis, the background was uniformly centered at an index value of 50 (±3) indicating that the backgrounds of all of the analyzed images were similar. A perfectly black background would have a value of 0; perfectly white, a value of 255 (summing to 256 shades of gray). To determine the hiding power, the black background was removed and the resulting distribution of white-gray level was evaluated. The hiding power mean index values were reported in which 50% of the intensity values were either more opaque or less opaque. Examples of the opacity distribution of two samples (inventive Samples 2 and comparative Sample 8) are presented in FIG. 2. Sample 2, with a mean index value of 133, has a greater hiding power and, hence, greater opacity, than Sample 8, with a mean index value of 108.

TABLE 2

| Sample No. | Mineralogy (mullite concentration) % | Mullite Crystallite Size (110) nm | Apparent Specific Gravity (ASTM C373) | Density (He-Pyc-nometry) g/cm³ | Porosity (Hg-Poro-simetry) (ml/g) | Hiding Power Mean (index) | Neat Granule Reflectance % | Color L* | a* | b* | Lab Panel Reflectance % | Trial Panel Reflectance % |
|---|---|---|---|---|---|---|---|---|---|---|---|---|
| 1 | 30.2 | 25.1 | 2.45 | 2.63 | 0.03 | 114 | 76.20% | 88.14 | −0.745 | 6.68 | 63.7 | — |
| 2 | 49.2 | 39.1 | 2.61 | 2.70 | 0.16 | 134 | 80.96% | 91.65 | −0.51 | 9.20 | 76.0 | 72% |
| 3 | 52.3 | 50.4 | 2.68 | 2.75 | 0.19 | 142 | 81.64% | 90.32 | 0.63 | 8.56 | 76.8 | 69% |
| 4 | 42.1 | 35.2 | 2.65 | 2.65 | 0.03 | 147 | 84.05% | 91.57 | 0.35 | 4.94 | 74.5 | — |
| 5 | 51.4 | 27.5 | 2.69 | 2.77 | 0.03 | 157 | 79.40% | 88.00 | 0.54 | 5.68 | 70.3 | — |
| 6 | 50.3 | >100 | 2.58 | 2.65 | 0.04 | 110 | 67.40% | 83.40 | −0.27 | 7.74 | 47.3 | — |
| 7 | 68.2 | >100 | 2.83 | 2.94 | 0.04 | 117 | 81.60% | 89.75 | −0.77 | 6.64 | 64.0 | — |
| 8 | 0.0 | NA | 3.69 | 3.78 | — | 108 | 73.60% | 87.00 | 0.53 | 2.95 | 62.0 | — |
| 9 | 14.7 | 57.5 | 2.46 | 2.49 | 0.03 | 209 | 46.50% | — | — | — | 42.5 | — |
| 10 | 13.6 | 65.1 | 2.51 | 2.57 | 0.03 | 151 | 51.70% | 66.57 | −1.37 | 5.42 | 45.5 | — |

Data for mineralogical phase identification and mullite crystallite size was collected using a Bruker D2 Phaser X-Ray Diffractometer. Apparent specific gravity data was obtained according to ASTM C373 entitled "Standard Test Method for Water Absorption, Bulk Density, Apparent Porosity, and Apparent Specific Gravity of Fired Whiteware Products". Density measurements were collected by Helium pycnometry using Micromeritics AccuPyc 1330. Porosity measurements were collected by Hg-porosimetry using Micromeritics AutoPore IV Mercury Porosimeter.

To quantify hiding power, an opacity measurement indicator, a photographic technique was developed. Granules were dry dispersed as a single layer of discreet particles directly on photographic paper (Polycontrast II RC, Kodak) or on a clear acetate sheet. The paper was exposed, using an enlarger, and the paper processing using standard photographic darkroom techniques. The exposure time was determined by qualitatively evaluating the contrast range using an opaque object (a coin). The full contrast range was a black background and a white circle where the coin was placed.

Neat granules were measured for solar reflectance according to ASTM C1549. Color, as measured by the CIE Lab L*, a*, and b* system using standard equipment is listed for Samples 1-10 as set forth in Table 2. The higher L* values correspond to base granules generally appearing visually whiter. It is herein noted that Sample 9 is visibly red in color due to coating by supplier for internal identification purposes; in cross-section, Sample 9 granules are visibly white in color. For reference, a white printer paper has values of L*=94.84, a*=0.53, and b*=−2.77. An asphalt compound, data having been collected using a ColorTec-PSM colorimeter, has values of L*=14.2, a*=−2.44, and b*=15.68.

Lab panel reflectance data was collected as follows. Asphalt coating samples were collected from the production line. The cooled sheets were heated in an oven at about 138° C. (280° F., for SBS compounds) or 160° C. (320° F., for APP compounds) between 30 and 60 minutes. A heavy layer of granules was poured over the asphalt sheet surface (approximately 6"×6" substrate), a release paper was placed over the granules, and then a plywood (12"×12") piece placed over top. The granules were then press down manually with a pressure of about 6 psi over the plywood. After a few seconds, the plywood and the release paper were removed. The excess granules were removed from the surface by inverting the panel followed by gentle tapping. The sample panels were then once again measured for solar reflectance according to ASTM C1549; results are listed on Table 2. Trial panel reflectance was measured in a similar manner, however, the granules were applied using production scale equipment rather than manual application as for lab panel reflectance. Scaled-up trial panel reflectance measurements are typically lower than lab panel reflectance; optimization of granule surface coverage over the asphalt and granule penetration into the asphalt is believed to cause this variability. For purposes of the trial panel reflectance, a plurality of highly reflective granules characterized by a tailored mullite concentration and tailored mullite crystallite size is applied to the bituminous substrate by conventional drop method at a temperature of about 177° C. The substrate then passes over a cooling water bath and is calendered to an optional second drop location at a temperature of about 121° C. The substrate is then further calendered with optional heating prior to a third optional drop at about 32° C.

Table 3 details aspect ratio of Samples 1-10. The aspect ratio of the crystallites was obtained through analysis of isolated mullite phase peaks corresponding to the (110) x-ray peak, perpendicular to the shortest crystallite dimension, and the (001) x-ray peak, perpendicular to the longest crystallite dimension. For Samples 6 and 7, the mullite phase crystallites are too large to assign values using this technique. Sample 8 was not measured using this technique, because the tabular alumina mineralogically consists entirely of alpha-$Al_2O_3$, therefore Sample 8 contains no mullite phase.

Samples 1-7 and 9-10 were ground to a powder with a particle size of approximately 10 μm. Diffraction patterns were generated using a X-ray Diffractometer (Siemens D500 Goniometer, Cu—Kα radiation, Phillips). The analyzing range was from 5° to 70° 2θ with 0.04° step size and 4 second dwell (count time). Phase identification and profile fitting were conducted using commercial software routines (Jade+, Version 10.1, Materials Data, Inc., Livermore, Calif., 1995). Grain size was estimated based on the theory of line broadening as discussed previously. Mullite diffraction peaks at 16.4° 2θ (110) (representing the smallest dimension) and 30.9° 2θ (001) (representing the longest dimension) were used to calculate the grain size in two different directions.

The aspect ratio of the granules was obtained by mounting granules in epoxy and then polishing through to reveal cross sections of numerous granules. Using an optical microscope and image analysis, the average aspect ratio of the granules was calculated. Mounted granules were prepared using transparent epoxy (Epo-Kwick® resin and hardener, No. 20-8130-128 and 20-8138-032, Buehler). Granules were placed on glass mold (3" in diameter and ½" in depth) and moderately vibrated to achieve a single layer of granules. Then liquid resin and hardener mixture was applied to the mold and cured. The flat surface (as cast) of the cured epoxy (including embedded granules) was optically scanned to collect the "x-y" dimension of the granules. After scanning, the disc was sliced perpendicular to the case surface using a diamond saw into strips and the cross sections were scanned to collect "z" dimensions. The scanned images were analyzed using commercial imaging software (Image-Pro Plus, v. 4.0, Media Cybernetics, Bethesda, Md.). The longest and shortest dimensions of each granule were measure in all scanned images. From this data, the overall average and standard deviations were calculated and used to create the aspect ratio by dividing the "x-y" average dimension by the "z" dimension. A granule aspect ratio of about one indicates equiaxed grains.

TABLE 3

| | Aspect Ratio of Mullite Crystallites | | | | | Aspect Ratio Aluminosilicate Granules | | | | |
|---|---|---|---|---|---|---|---|---|---|---|
| | nm | (110) | nm | (001) | Aspect | x/y | | x/z | | Aspect |
| Sample No. | averg. | st. dev. | averg. | st. dev. | Ratio | averg. | st. dev. | averg. | st. dev. | Ratio |
| 1 | 25.1 | 1.2 | 41.6 | 5.8 | 1.7 | 1.77 | 1.01 | 1.49 | 0.40 | 0.8 |
| 2 | 39.1 | 1.0 | 87.9 | 7.8 | 2.2 | 1.83 | 1.13 | 2.99 | 1.33 | 1.6 |
| 3 | 50.4 | 1.0 | 85.0 | 6.0 | 1.7 | 1.51 | 0.35 | 1.80 | 0.98 | 1.2 |
| 4 | 35.2 | 0.7 | >100 | 11.2 | >3 | 1.74 | 0.97 | 1.47 | 0.44 | 0.8 |
| 5 | 27.5 | 0.6 | 97.5 | 5.3 | 3.5 | 1.64 | 0.54 | 1.52 | 0.42 | 0.9 |
| 6 | >100 | * | >100 | * | NA | 1.62 | 0.43 | 1.85 | 0.91 | 1.1 |
| 7 | >100 | * | >100 | * | NA | 1.67 | 0.47 | 1.73 | 0.73 | 1.0 |
| 8 | — | — | — | — | NA | — | — | — | — | — |
| 9 | 57.5 | 2.1 | >100 | 8.2 | >2 | 1.77 | 1.20 | 1.52 | 0.69 | 0.9 |
| 10 | 65.1 | 1.0 | 229 | 8.7 | >3 | 1.72 | 0.61 | 1.48 | 0.44 | 0.9 |

* not measurable by technique
NA not applicable
— no data

In one or more embodiments, the average trial panel reflectivity is measured by ASTM C-1549 and is reported on Table 2 based upon two reflectance readings; for Sample 3 the trial panel reflectivity is 72%, and for Sample 4 the trial panel reflectivity is 69%. Subsequent (second and/or third) dropping of granules, which may be characterized by a finer, narrow particle size distribution, have also been shown to further improve panel reflectivity.

Various modifications and alterations that do not depart from the scope and spirit of this invention will become apparent to those skilled in the art. This invention is not to be duly limited to the illustrative embodiments set forth herein.

What is claimed is:
1. A method of making a reflective roofing article, the method comprising the steps of:
    (a) providing a hot asphaltic substrate; and
    (b) applying by gravity a plurality of granules to the hot asphaltic substrate, wherein the plurality of granules are mullite-containing granules that include mullite crystallites dispersed within a non-mullite phase, the granules including a mullite concentration of at least 35 wt % and at most 63 wt % as determined by quantitative x-ray diffraction, and where the mullite crystallites have a size of at least 25 nm and at most 65 nm as determined by x-ray diffraction line broadening by the isolated (110), and where the mullite crystallites have an aspect ratio of at least 1.5, where the aspect ratio is a ratio of the mullite crystallite size by the isolated (001) x-ray diffraction peak to the mullite crystallite size by the isolated (110) x-ray diffraction peak.

2. The method of claim 1, where said step of applying includes multiple, sequential drops of the mullite-containing granules to the hot asphaltic substrate.

3. The method of claim 2, where the granules dropped in a first step are characterized by a first size and where the granules dropped in a second step are characterized by a second size, and where the first size is larger than the second size.

4. The method of claim 3, wherein during the step of applying the hot asphaltic substrate is at a temperature of at least 150° C.

5. The method of claim 4, wherein the during the step of applying the hot asphaltic substrate is at a temperature of at most 220° C.

6. The method of claim 5, wherein during the step of applying the hot asphaltic substrate is at a temperature of between about 160° C. and about 195° C.

7. The method of claim 6, wherein during the step of applying the hot asphaltic substrate is at a temperature of between about 170° C. and about 185° C.

8. The method of claim 1, where said step of providing a hot asphaltic substrate includes providing a hot polymer-modified membrane including a fiberglass scrim.

* * * * *